US008382126B1

(12) United States Patent
Gantt

(10) Patent No.: US 8,382,126 B1
(45) Date of Patent: Feb. 26, 2013

(54) MOBILE WHEELCHAIR LIFT SYSTEM

(76) Inventor: Mamie L. Gantt, Pickens, SC (US)

(*) Notice: Subject to any disclaimer, the term of this patent is extended or adjusted under 35 U.S.C. 154(b) by 0 days.

(21) Appl. No.: 13/412,617

(22) Filed: Mar. 6, 2012

(51) Int. Cl.
*B60N 2/28* (2006.01)
*A47K 3/02* (2006.01)
*B66F 3/22* (2006.01)

(52) U.S. Cl. ............................ 280/30; 4/566.1; 414/495

(58) Field of Classification Search ........... 280/124.128, 280/47.38, 304.1, 250.1, 755, 124.164, 767, 280/124.1, 24.07, 59, 60, 124.04, 754, 124.116, 280/124.118, 86.1, 87.043, 304.5, 296, 292, 280/291; 187/220, 223–224, 300; 414/921, 414/495, 540, 474, 537; 182/141; 244/137.1, 244/137.2

See application file for complete search history.

(56) References Cited

U.S. PATENT DOCUMENTS

| | | | | | |
|---|---|---|---|---|---|
| 4,415,202 | A | | 11/1983 | Pew | |
| 4,768,497 | A | * | 9/1988 | Winge | 601/26 |
| 4,934,723 | A | * | 6/1990 | Dysarz | 280/250.1 |
| 5,154,569 | A | * | 10/1992 | Eryou et al. | 414/495 |
| 5,513,867 | A | | 5/1996 | Bloswick et al. | |
| 5,520,403 | A | | 5/1996 | Bergstrom et al. | |
| 5,669,086 | A | * | 9/1997 | Garman | 5/86.1 |
| D431,502 | S | | 10/2000 | Schlangen | |
| 6,179,076 | B1 | * | 1/2001 | Fernie et al. | 180/65.1 |
| 6,276,704 | B1 | | 8/2001 | Suiter | |
| 6,467,785 | B2 | | 10/2002 | Toppses | |
| 7,219,912 | B2 | | 5/2007 | Meyer | |
| 2003/0011229 | A1 | | 1/2003 | Bell | |
| 2008/0169158 | A1 | * | 7/2008 | Lam | 187/211 |
| 2008/0250984 | A1 | * | 10/2008 | Panzarella et al. | 108/44 |
| 2009/0158536 | A1 | * | 6/2009 | Holicki | 14/69.5 |
| 2009/0255067 | A1 | * | 10/2009 | Budd et al. | 14/71.1 |
| 2010/0080678 | A1 | * | 4/2010 | Beck et al. | 414/539 |
| 2011/0015045 | A1 | * | 1/2011 | Pestes | 482/60 |

* cited by examiner

*Primary Examiner* — John Walters
*Assistant Examiner* — James Triggs

(57) ABSTRACT

A mobile wheelchair lift system includes a wheelchair that includes a pair of rear wheels and a pair of front wheels. A panel has a top side and a bottom side. A plurality of wheels each is attached to the bottom side. A lift has a first end and a second end. The first end comprises a base and the second end comprises a mount that is attached to the bottom side. The lift is positioned in a first position to lift the panel upwardly from a support surface. The lift is positioned in a second position lower the wheels onto the support surface. A ramp is hingedly coupled to the rear edge. The ramp has an upper side, a lower side and a peripheral edge. The ramp is may be positioned in an extended position to allow the wheelchair to be rolled onto or off of the panel.

9 Claims, 5 Drawing Sheets

MOBILE WHEELCHAIR LIFT SYSTEM

BACKGROUND OF THE DISCLOSURE

Field of the Disclosure

The disclosure relates to mobile wheelchair lift devices and more particularly pertains to a new mobile wheelchair lift device for lifting a wheelchair.

SUMMARY OF THE DISCLOSURE

An embodiment of the disclosure meets the needs presented above by generally comprising a wheelchair that includes a pair of rear wheels and a pair of front wheels. A panel has a top side, a bottom side and a perimeter edge. The perimeter edge includes a front edge, a rear edge, a first lateral edge and a second lateral edge. A plurality of wheels each is attached to the bottom side. A lift has a first end and a second end. The first end comprises a base and the second end comprises a mount that is attached to the bottom side. The lift is selectively positionable in a first position so the base is telescopically extended downwardly from the bottom side. In the first position the base engages a support surface to lift the panel upwardly from the support surface. The lift is selectively positionable in a second position so the first end is retracted upwardly toward the bottom side to lower the wheels onto the support surface. A ramp is hingedly coupled to the rear edge. The ramp has an upper side, a lower side and a peripheral edge. The peripheral edge includes a first edge, a second edge, a third edge and a fourth edge. The ramp is selectively positionable in an extended position so that the second edge abuts the support surface to allow the wheelchair to be rolled onto or off of the panel. The ramp is selectively positionable in a stored position so the ramp extends vertically from the top side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
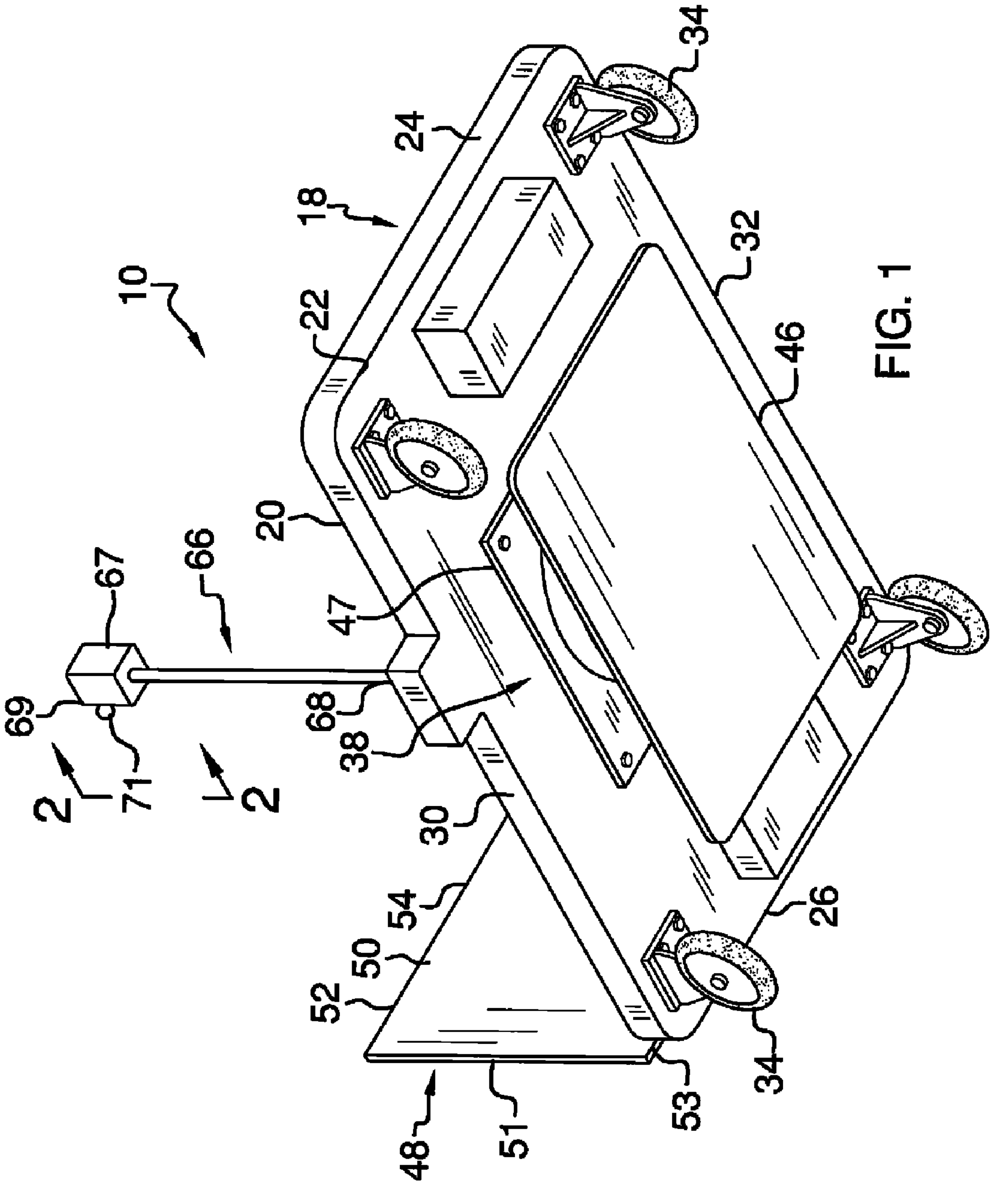
FIG. 1 is a bottom side perspective view of a mobile wheelchair lift system according to an embodiment of the disclosure.
Figure 3:
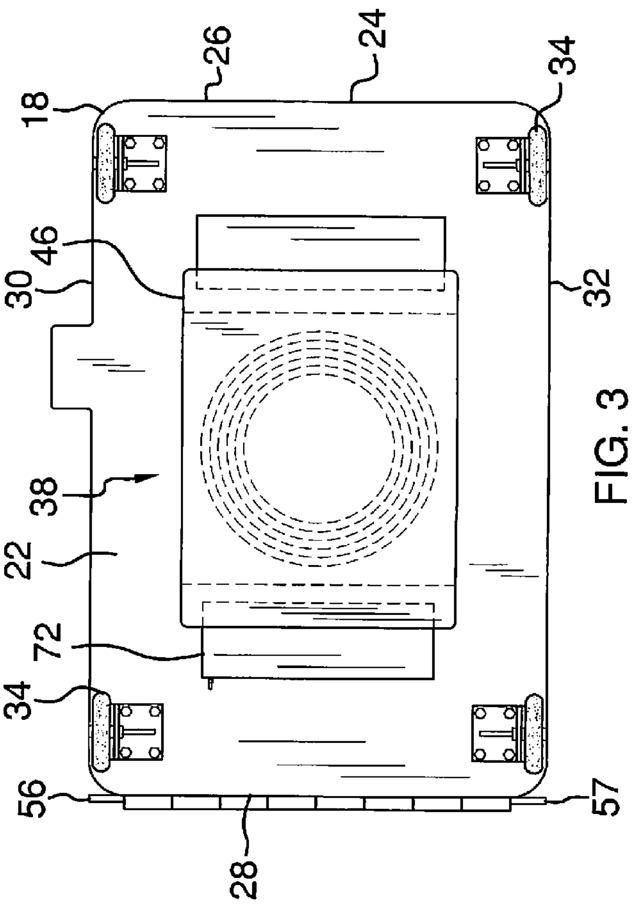
FIG. 3 is a bottom view of an embodiment of the disclosure.
Figure 2:
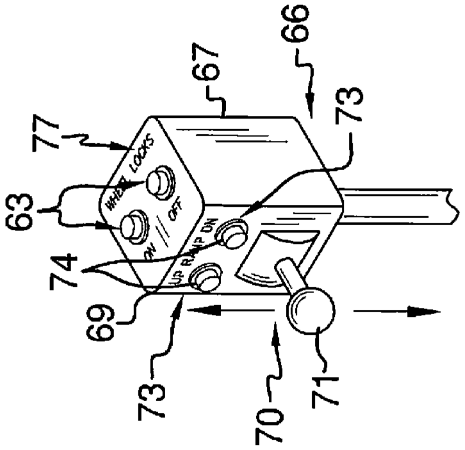
FIG. 2 is a cross sectional view taken along line 2-2 of FIG. 1 of an embodiment of the disclosure.
Figure 5:
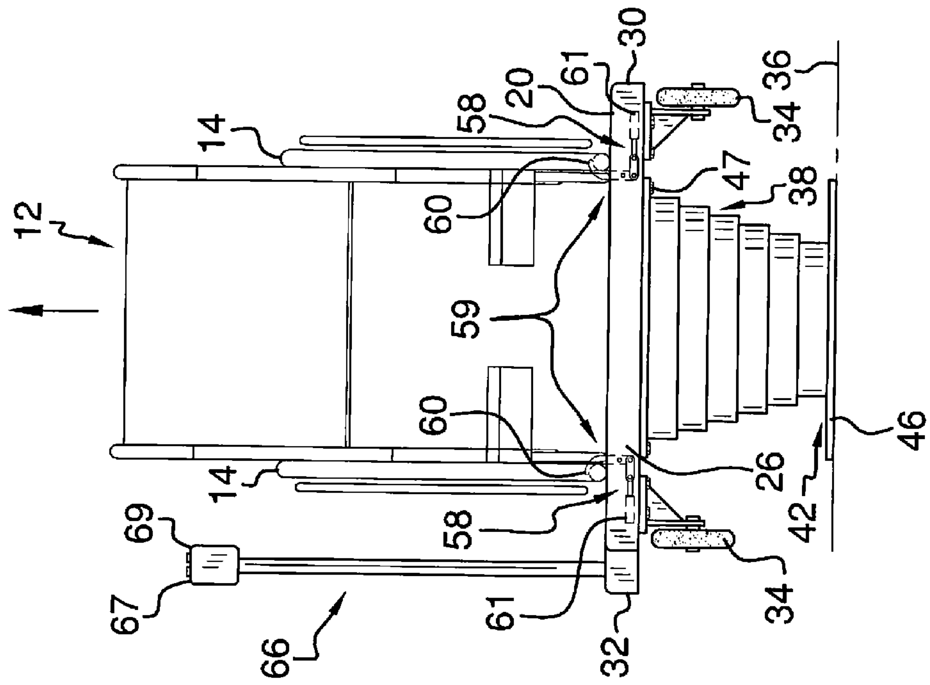
FIG. 5 is a back view of an embodiment of the disclosure.
Figure 4:
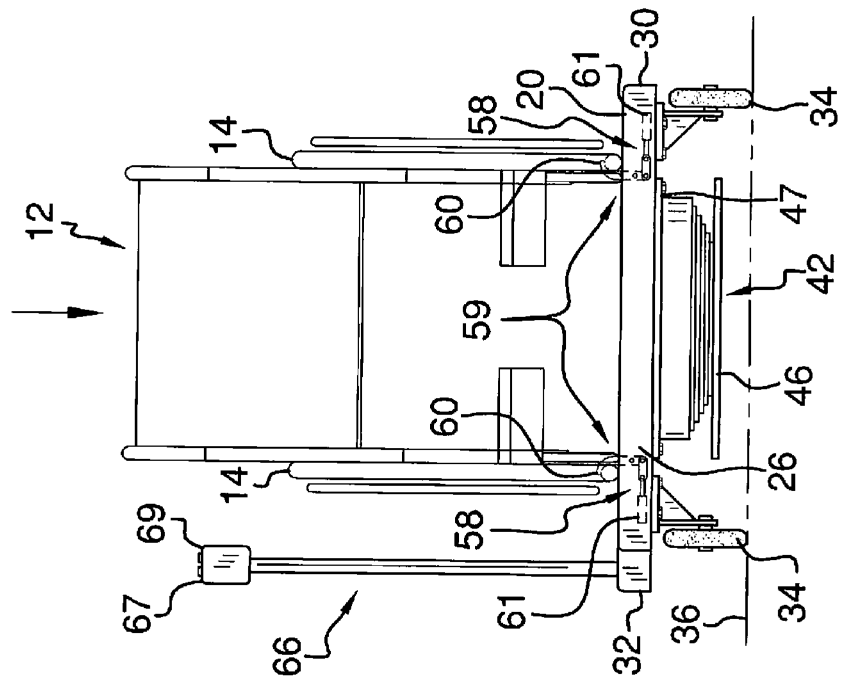
FIG. 4 is a back view of an embodiment of the disclosure.
Figure 6:
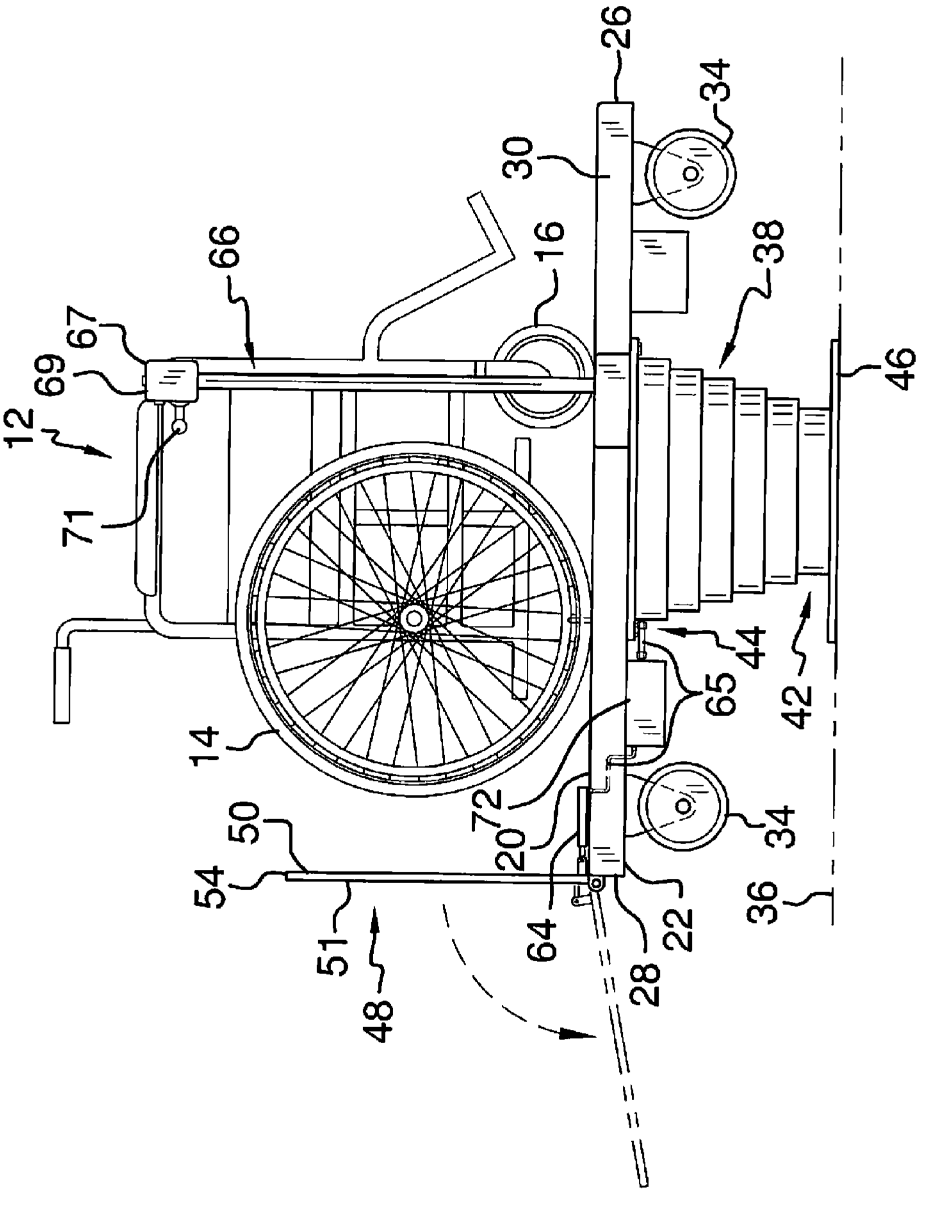
FIG. 6 is a right side view of an embodiment of the disclosure.
Figure 7:
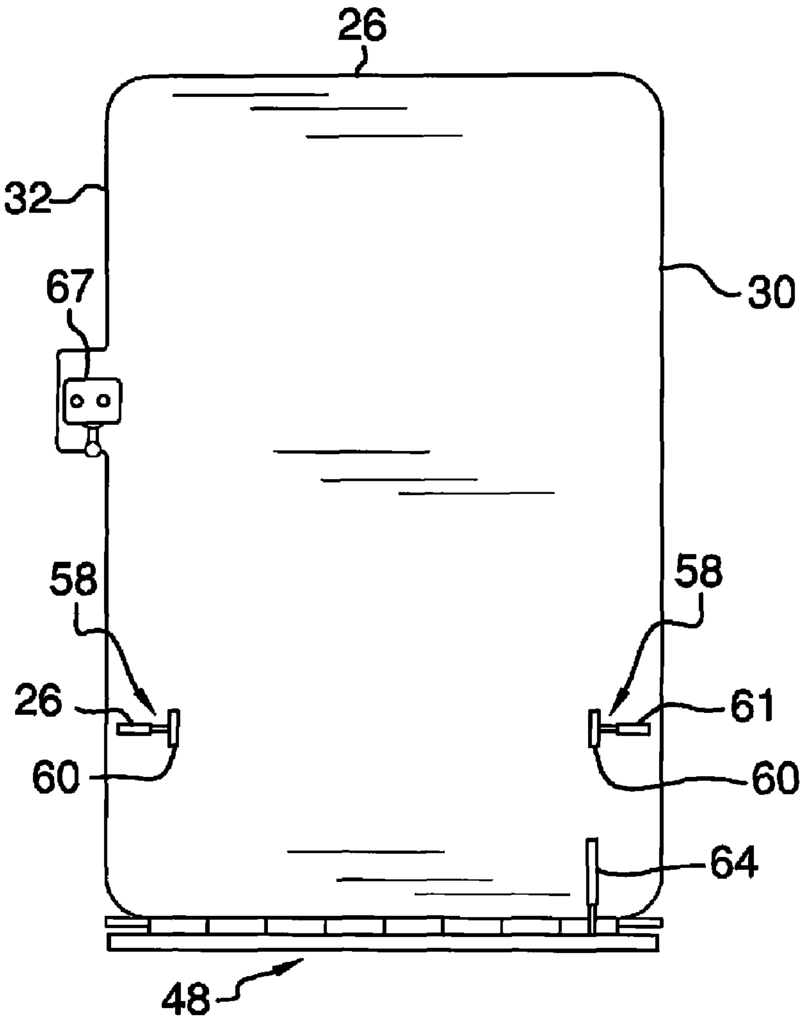
FIG. 7 is a top view of an embodiment of the disclosure.
Figure 8:
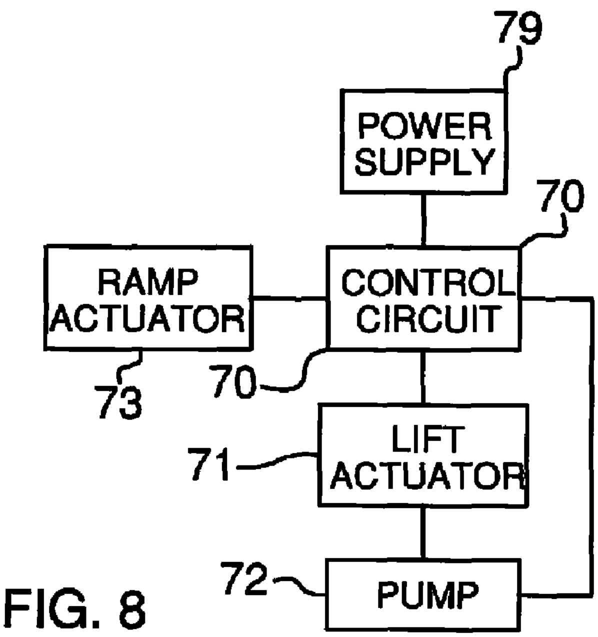
FIG. 8 is a schematic view of an embodiment of the disclosure.

With reference now to the drawings, and in particular to FIGS. 1 through 8 thereof, a new mobile wheelchair lift device embodying the principles and concepts of an embodiment of the disclosure and generally designated by the reference numeral 10 will be described.

As best illustrated in FIGS. 1 through 8, the mobile wheelchair lift system 10 generally comprises a generally conventional wheelchair 12 that includes a pair of rear wheels 14 and a pair of front wheels 16. A panel 18 has a top side 20, a bottom side 22 and a perimeter edge 24. The perimeter edge 24 includes a front edge 26, a rear edge 28, a first lateral edge 30 and a second lateral edge 32. The panel 18 has four corners. The panel 18 may comprise a housing with a hollow interior. A plurality of wheels 34 each is attached to the bottom side 22 adjacent to a corresponding one of each of the four corners. The wheels 34 are free rolling to allow the panel 18 to be manually positioned on a support surface 36. The wheels 34 may elevate the panel 18 above the support surface 36 a distance between 8.0 inches and 20.0 inches. At least two of the wheels 34 may be selectively rotatable about a vertical axis to allow the panel 18 to be maneuvered around a corner or positioned into a small space.

A lift 38, which may comprise a hydraulically actuated lift, has a first end 42 and a second end 44. The first end 42 comprises a base 46 and the second end 44 comprises a mount 48 that is attached to the bottom side 22. The lift 38 is selectively positionable in a first position so the base 46 is telescopically extendable downwardly from the bottom side 22. In the first position the base 46 engages the support surface 36 to lift the panel 18 upwardly from the support surface 36. The lift 38 is selectively positionable in a second position so the first end 42 is retracted upwardly toward the bottom side 22 to lower the wheels 34 onto the support surface 36.

A ramp 48 is hingedly coupled to the rear edge 28. The ramp 48 has an upper side 50, a lower side 51 and a peripheral edge 52. The peripheral edge 52 includes a first edge 53, a second edge 54, a third edge 56 and a fourth edge 57. The ramp 48 is selectively positionable in an extended position so that the second edge 54 abuts the support surface 36 to allow the wheelchair 12 to be rolled onto or off of the panel 18. The ramp 48 is selectively positionable in a stored position so the ramp 48 extends vertically from the top side 20.

A wheel lock apparatus 58 releasably engages the wheelchair 12 and restricts motion of the wheelchair 12 when the wheel lock apparatus 58 is actuated to a locking position. The wheel lock apparatus 58 includes a pair of locks 59. Each of the locks 59 is positioned to releasably engage one of the rear wheels 14. Each of the locks 59 includes an arm 60 that is pivotally coupled to the panel 18. The arm 60 is positioned in a release position or in a locked position extending over one of the rear wheels 14. It should be understood from the Figures that the panel 18 may include the lock apparatus 58 being embedded into and extending upwardly from the panel 18.

A pair of arm positioners 61 is positioned on the panel 18 and each is mechanically coupled a corresponding one of the arms 60. The arm positioner 61 may comprise a hydraulic cylinder. A lock actuator 63 is in electrical communication with the pair of locks 59 to actuate the arm 60 of each of the locks 59 between the release position and the locked position. While two buttons are shown, the lock actuator 63 may include a single button. A ramp positioner 64 comprising a hydraulic cylinder is positioned on the panel 18 and is mechanically coupled to the ramp 48. The ramp positioner 64 is actuated to position the ramp 48 in the extended position or to the stored position.

A plurality of fluid conduits 65 is in fluid communication with a corresponding one of the arm positioners 61, the ramp positioner 48 and the lift 38 if each is to be moved by way of hydraulics. Each of the fluid conduits 65 directs a hydraulic fluid to each of the arm positioners 61, the ramp positioner 48 and the lift 38. A rod 66 is attached to and extends vertically from the top side 20. The rod 66 has a top end 67 and a bottom end 68. The top end 68 comprises a housing 69.

A control circuit 70 is attached to the housing 69. The control circuit 70 includes a lift actuator 71 that is electrically coupled to the lift 38 to actuate the lift 38 between the first and second positions. A hydraulic pump 72 is in fluid communication with each of the fluid conduits 65 and is attached to the bottom side 22. The hydraulic pump 72 is selectively actuated to direct the hydraulic fluid into and out of each of the arm positioners 61, the ramp positioner 64 and the lift 38. The control circuit 70 may be powered by any conventional power supply 8 such as a battery.

The lift actuator 71 is in electrical communication with the hydraulic pump 72 and is positioned on the housing 69. The lift actuator 71 is positionable in a lifting position to actuate the hydraulic pump 72 to position the lift 38 in the first position. The lift actuator 71 is positionable in a lowering position to actuate the hydraulic pump 72 to position the lift 38 in the second position. The lift actuator 71 may comprise a positionable lever.

A ramp actuator 73 is in electrical communication with the hydraulic pump 72 and is positioned on the housing 69. The ramp actuator 73 is positionable in a first position to actuate the hydraulic pump 72 to position the ramp positioner 64 in the extended position. The ramp actuator 73 is positionable in a second position to actuate the hydraulic pump 72 to position the ramp positioner 64 in the stored position. The ramp actuator 73 may comprise a pair of single throw actuators 74.

The lock actuator 63 is in electrical communication with the hydraulic pump 72 and is positioned on the housing 69. The lock actuator 63 is positionable in a first position to actuate the hydraulic pump 72 to position each arm of the locks 59 in the release position. The lock actuator 63 is positionable in a second position to actuate the hydraulic pump 72 to position each arm of the locks 59 in the locked position. The lock actuator 63 may comprise a pair of single throw actuators 74.

A power supply 75 is in electrical communication with the lift actuator 71, the ramp actuator 73 and the lock actuator 63. The power supply 75 is attached to the bottom side 22 and the power supply 75 comprises at least one rechargeable battery 76. The lift 38, the ramp positioner 64 and the arm positioner 61 may comprise electrical motors rather than hydraulic cylinders. The housing 69 may have indicia 77 printed on it. The indicia 77 comprise operational instructions.

In use, the wheelchair 12 may be rolled up the ramp 48 and onto the panel 18. The panel 18 may be positioned near an elevated support surface 36 and the lift 38 may be actuated to allow the wheelchair to 12 be rolled onto the elevated support surface 36. The wheelchair 12 may conversely be rolled off of the elevated support surface 36 onto the panel 18 to be lowered to a lower support surface 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A mobile wheelchair lift system configured for lifting a wheelchair, said system comprising:

a wheelchair including a pair of rear wheels and a pair of front wheels;

a panel having a top side, a bottom side and a perimeter edge, said perimeter edge including a front edge, a rear edge, a first lateral edge and a second lateral edge;

a plurality of wheels each being attached to said bottom side;

a lift having a first end and a second end, said first end comprising a base, said second end comprising a mount being attached to said bottom side, said lift being selectively positionable in a first position having said base being telescopically extendable downwardly from said bottom side such that said base engages a support surface to lift said panel upwardly from the support surface, said lift being selectively positionable in a second position having said first end being retracted upwardly toward said bottom side to lower said wheels onto the support surface;

a ramp being hingedly coupled to said rear edge, said ramp having an upper side, a lower side and a peripheral edge, said peripheral edge including a first edge, a second edge, a third edge and a fourth edge, said ramp being selectively positionable in an extended position having said second edge abutting the support surface to allow said wheelchair to be rolled onto or off of said panel, said ramp being selectively positionable in a stored position having said ramp extending vertically from said top side; and a ramp positioner being positioned on said panel and being mechanically coupled to said ramp, said ramp positioner being actuated to position said ramp in said extended position or to said stored position, said ramp positioner comprising a hydraulic cylinder.

2. The system according to claim 1, further including a wheel lock apparatus releasably engaging said wheelchair and restricting motion of said wheelchair when said wheel lock apparatus is actuated to a locking position.

3. The system according to claim 2, wherein said wheel lock apparatus includes a pair of locks, each of said locks being positioned to releasably engaging one of said rear wheels, each of said locks including a lock actuator being in electrical communication with said pair of locks to actuate said arm of each of said locks between a release position and a locked position.

4. A mobile wheelchair lift system configured for lifting a wheelchair, said system comprising:

a wheelchair including a pair of rear wheels and a pair of front wheels;

a panel having a top side, a bottom side and a perimeter edge, said perimeter edge including a front edge, a rear edge, a first lateral edge and a second lateral edge;

a plurality of wheels each being attached to said bottom side;

a lift having a first end and a second end, said first end comprising a base, said second end comprising a mount being attached to said bottom side, said lift being selectively positionable in a first position having said base being telescopically extendable downwardly from said bottom side such that said base engages a support surface to lift said panel upwardly from the support surface, said lift being selectively positionable in a second position having said first end being retracted upwardly toward said bottom side to lower said wheels onto the support surface;

a ramp being hingedly coupled to said rear edge, said ramp having an upper side, a lower side and a peripheral edge, said peripheral edge including a first edge, a second edge, a third edge and a fourth edge, said ramp being selectively positionable in an extended position having said second edge abutting the support surface to allow said wheelchair to be rolled onto or off of said panel, said ramp being selectively positionable in a stored position having said ramp extending vertically from said top side;

a wheel lock apparatus releasably engaging said wheelchair and restricting motion of said wheelchair when said wheel lock apparatus is actuated to a locking position;

wherein said wheel lock apparatus includes a pair of locks, each of said locks being positioned to releasably engaging one of said rear wheels, each of said locks including, and a lock actuator being in electrical communication with said pair of locks to actuate said arm of each of said locks between a release position and a locked position; and wherein each of said locks includes an arm being pivotally coupled to said panel, said arm being positioned in said release position or in said locked position extending over one of said rear wheels, and an arm positioner being positioned on said panel and being mechanically coupled to said arm, said arm positioner comprising a hydraulic cylinder.

5. The system according to claim 4, further including a ramp positioner being positioned on said panel and being mechanically coupled to said ramp, said ramp positioner being actuated to position said ramp in said extended position or to said stored position, said ramp positioner comprising a hydraulic cylinder.

6. A mobile wheelchair lift system configured for lifting a wheelchair, said system comprising:

a wheelchair including a pair of rear wheels and a pair of front wheels;

a panel having a top side, a bottom side and a perimeter edge, said perimeter edge including a front edge, a rear edge, a first lateral edge and a second lateral edge;

a plurality of wheels each being attached to said bottom side;

a lift having a first end and a second end, said first end comprising a base, said second end comprising a mount being attached to said bottom side, said lift being selectively positionable in a first position having said base being telescopically extendable downwardly from said bottom side such that said base engages a support surface to lift said panel upwardly from the support surface, said lift being selectively positionable in a second position having said first end being retracted upwardly toward said bottom side to lower said wheels onto the support surface;

a ramp being hingedly coupled to said rear edge, said ramp having an upper side, a lower side and a peripheral edge, said peripheral edge including a first edge, a second edge, a third edge and a fourth edge, said ramp being selectively positionable in an extended position having said second edge abutting the support surface to allow said wheelchair to be rolled onto or off of said panel, said ramp being selectively positionable in a stored position having said ramp extending vertically from said top side;

a rod being attached to and extending vertically from said top side, said rod having a top end and a bottom end, said top end comprising a housing; and a control circuit being positioned in said housing, said control circuit being operationally coupled to said lift to actuate said lift between said first and second positions.

7. The system of claim 1, further comprising:

a wheel lock apparatus releasably engaging said wheelchair and restricting motion of said wheelchair when said wheel lock apparatus is actuated to a locking position, said wheel lock apparatus including a pair of locks, each of said locks being positioned to releasably engage one of said rear wheels, each of said locks including an arm being pivotally coupled to said panel, said arm being positioned in a release position or in a locked position extending over one of said rear wheels, and an arm positioner being positioned on said panel and being mechanically coupled to said arm, said lock positioner comprising a hydraulic cylinder;

a lock actuator being in electrical communication with said pair of locks to actuate said arm of each of said locks between said release position and said locked position;

a rod being attached to and extending vertically from said top side, said rod having a top end and a bottom end, said top end comprising a housing; and a control circuit being positioned in said housing, said control circuit being operationally coupled to said lift to actuate said lift between said first and second positions.

8. The system according to claim 6, further including a wheel lock apparatus releasably engaging said wheelchair and restricting motion of said wheelchair when said wheel lock apparatus is actuated to a locking position.

9. The system according to claim 8, wherein said wheel lock apparatus comprises a pair of locks, each of said locks being positioned to releasably engaging one of said rear wheels, each of said locks including a lock actuator being in electrical communication with said pair of locks to actuate said arm of each of said locks between a release position and a locked position.

* * * * *